United States Patent [19]
Murrish et al.

[11] Patent Number: 5,195,398
[45] Date of Patent: Mar. 23, 1993

[54] CRANKSHAFT COUNTERWEIGHTS

[75] Inventors: Dale E. Murrish; Thomas M. Briolat, both of Troy, Mich.

[73] Assignee: General Motors Corporation, Detroit, Mich.

[21] Appl. No.: 781,309

[22] Filed: Oct. 24, 1991

[51] Int. Cl.$^5$ ............................................... F16C 3/04
[52] U.S. Cl. .................... 74/603; 123/192.2; 74/595
[58] Field of Search ............... 74/603, 595; 123/192.1, 123/192.2

[56] References Cited

U.S. PATENT DOCUMENTS

| | | |
|---|---|---|
| 1,283,970 | 11/1918 | Thomas. |
| 2,426,875 | 9/1947 | Hasbrouk et al. ............... 74/603 X |
| 2,680,427 | 6/1954 | Summers ......................... 74/603 X |
| 2,817,980 | 12/1957 | Eberhard ......................... 74/603 |
| 3,835,728 | 9/1974 | Bernard ........................... 74/603 |
| 4,351,202 | 9/1982 | Summers ......................... 74/603 X |
| 4,552,104 | 11/1985 | Hara et al. ....................... 74/603 X |
| 4,569,316 | 2/1986 | Suzuki .............................. 74/603 X |
| 4,644,916 | 2/1987 | Kitagawa ......................... 74/603 X |
| 4,699,098 | 10/1987 | Hoshiba et al. ................ 123/192 B |
| 4,730,512 | 3/1988 | Ito et al. ........................... 74/595 |
| 4,833,940 | 5/1989 | Ito ..................................... 74/595 |
| 5,000,141 | 3/1991 | Sugano ............................ 123/192.2 |
| 5,063,892 | 11/1991 | Maiorana ......................... 74/603 X |

Primary Examiner—Leslie A. Braun
Assistant Examiner—Andrea Pitts
Attorney, Agent, or Firm—Gordon F. Belcher

[57] ABSTRACT

A crankshaft for a V-type engine including crankshaft counterweights which are angularly aligned with respect to the crank arms and sized to reduce the weight of the crankshaft and facilitate lubrication of the crankshaft main journals supported in the main bearings.

5 Claims, 1 Drawing Sheet

U.S. Patent  Mar. 23, 1993  5,195,398
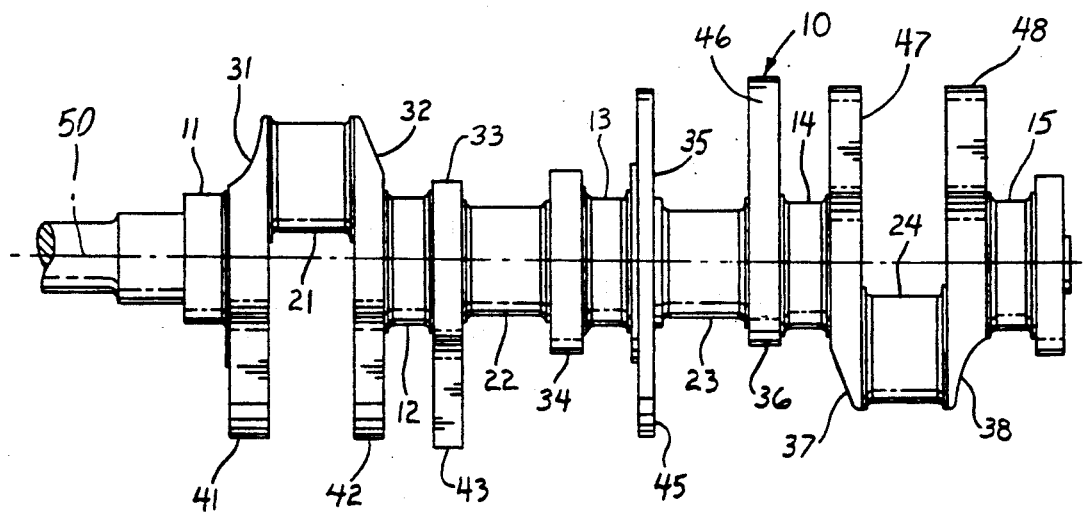
Fig. 1
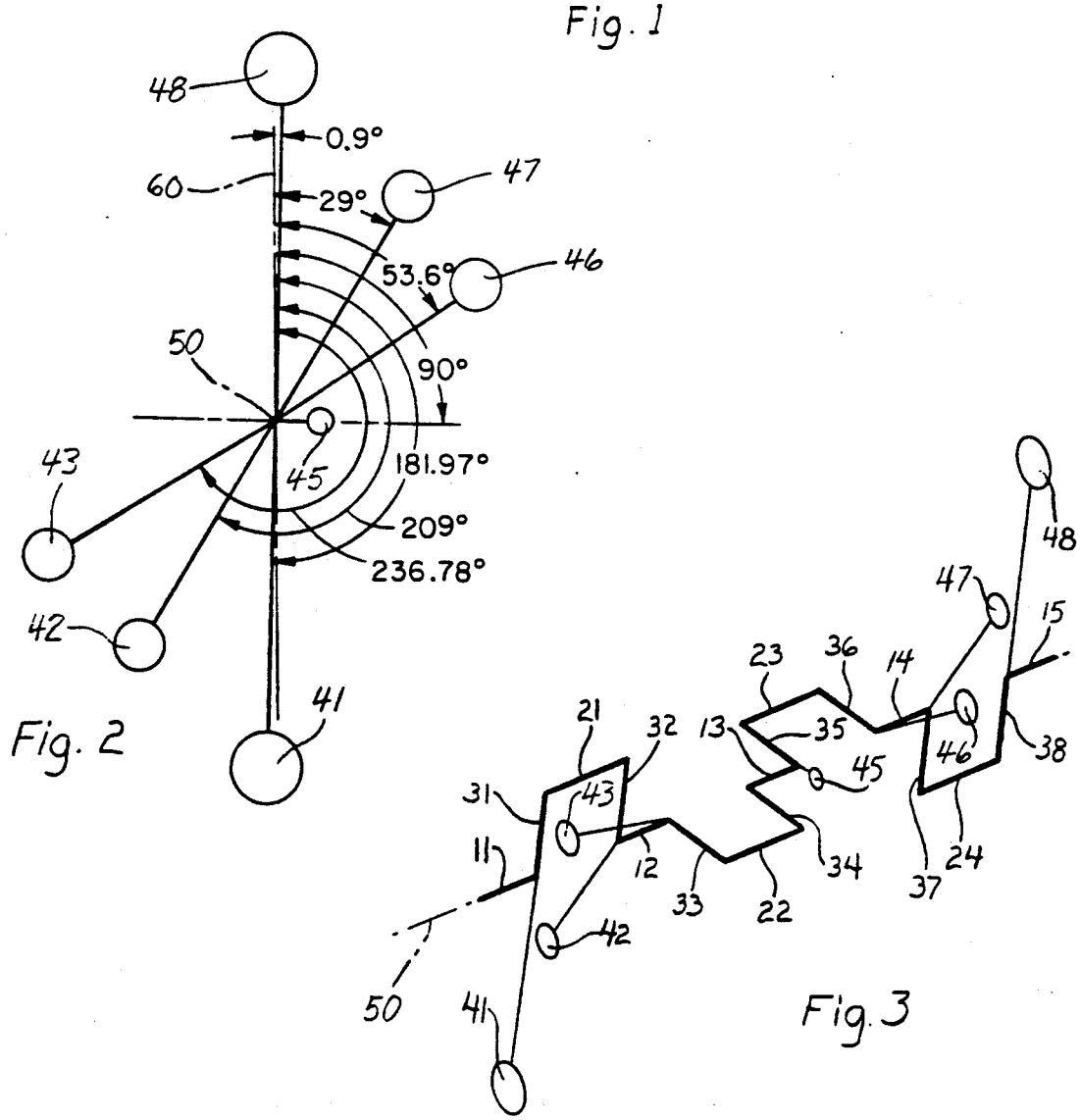
Fig. 2
Fig. 3

CRANKSHAFT COUNTERWEIGHTS

TECHNICAL FIELD

This invention relates to a crankshaft with counterweights or use in a V-type engine and, more particularly, to a crankshaft with counterweights which are angularly aligned with respect to the crank arms and sized to reduce the weight of the crank shaft and increase the load carrying capacity of the main journals.

BACKGROUND

Crankshafts for V-8 engines typically require counterweights n order to balance the forces created by rotation of the crankshaft with the connecting rods connected to the crankpins. Such balancing also results in increased minimum oil film thickness between the main journals of the crankshaft and the main bearing thereby increasing the load carrying capacity of the main journals. It is desirable to limit the size and number of counterweights to limit the weight of the crankshaft.

SUMMARY OF THE INVENTION

The present invention provides an internally balanced crankshaft having Nos. 1-3 and 6-8 counterweights wherein counterweights angles are defined by the angle between Nos. 1 and 8, 2 and 7, and 3 and 6 counterweights, respectively. At least one of the counterweight angles is not 180 degrees.

The asymmetry of at least one of the counterweight pairs (i.e., at least one of the counterweight angles not being 180 degrees) results in a 9% increase in the high speed minimum oil film thickness of the main journal having the smallest minimum oil film thickness, as compared to a crankshaft having symmetric counterweights. This is achieved without increasing the weight of the crankshaft.

These and other features and advantages of the invention will be more fully understood from the following description of certain specific embodiments of the invention taken together with the accompanying drawings.

BRIEF DRAWING DESCRIPTION

In the drawings:

FIG. 1 is a longitudinal view of a crankshaft of the present invention;

FIG. 2 is a schematic elevation view of the crankshaft of FIG. 1 in a direction facing an end of the crankshaft showing the angular alignments of the counterweight centers of mass; and FIG. 3 is a schematic perspective view of the crankshaft of FIG. 1 showing the longitudinal positions of the counterweight centers of mass.

Corresponding reference characters indicate corresponding parts throughout the several views of the drawings.

DETAILED DESCRIPTION

Referring to the drawings, and in particular, FIG. 1, numeral 10 generally refers to a crankshaft of the present invention for an eight-cylinder V-type engine. The crankshaft 10 comprises a first main journal 11, a second main journal 12, a third main journal 13, a fourth main journal 14 and a fifth main journal 15. The diameter of each main journal 11, 12, 13, 14 and 15 is approximately 64 mm. The longitudinal axes of the main journals 11, 12, 13, 14 and 15 are rotatably supported in main bearings which are mounted in a cylinder block having a bank angle of 90 degrees.

The crankshaft 10 further comprises a first crank pin 21, a second crank pin 22, a third crank pin 23 and a fourth crank pin 24. When the crankshaft is viewed from the front of the engine, crank pin 22 is located 90 degrees clockwise from crank pin 21. Crank pin 23 is located 180 degrees from crank pin 22, and crank pin 24 is located 180 degrees from crank pin 21. Each of the crank pins 21, 22, 23, 24 supports two connecting rods, which transfer gas pressure and inertia loads from the piston and connecting rod to the crankshaft. Crank pin 21 supports connecting rods corresponding to cylinders 1 and 2. Crank pin 22 supports connecting rods corresponding to cylinders 3 and 4. Crank pin 23 supports connecting rods corresponding to cylinders 5 and 6. Crank pin 24 supports connecting rods corresponding to cylinders 7 and 8.

The main journals 11, 12, 13, 14, 15 and crank pins are connected by a first crank arm 31, a second crank arm 32, a third crank arm 33, a fourth crank arm 34, a sixth crank arm 36, a seventh crank arm 37 and an eighth crank arm 38, as shown in FIG. 1. A portion of an ignition timing wheel constitutes a fifth crank arm 35. Crank arms 31, 32, 33, 36, 37 and 38 have a No. 1 counterweight 41, a No. 2 counterweight 42, a No. 3 counterweight 43, a No. 6 counterweight 46, a No. 7 counterweight 47 and a No. 8 counterweight 48 attached to them, respectively, as shown in FIGS. 1 and 3. Crank arm 34 has no corresponding counterweight. The timing wheel has the net effect of an uncounterweighted crank arm 35 and a small No. 5 counterweight 45 when compared to crank arm 34 which has no counterweight. The No. 5 counterweight 45 is oriented so that a plane extending from its center of gravity to the crankshaft axis 50 is rotated between 50 and 90 degrees (preferably 90 degrees) from the crankshaft plane 60 in the clockwise direction.

The axes of the main journals 11, 12, 13, 14 and 15 define a crankshaft axis 50 and a crankshaft plane 60. The crankshaft plane 60 extends between the crankshaft axis 50 and the axis of the first crank pin 21.

a No. 1 counterweight 41 is connected to the first crank arm 31. The No. 1 counter 41 is oriented so that a plane extending from its center of gravity to the crankshaft axis 50 is rotated between 180 and 190 degrees (preferably 181.97 degrees) from the crankshaft plane 60 in the clockwise direction.

A No. 2 counterweight 42 is connected to the second crank arm 32. The No. 2 counterweight 42 is oriented so that a plane extending from its center of gravity to the crankshaft axis 50 is rotated between 200 and 220 degrees (preferably 209 degrees) from the crankshaft plane 60 in the clockwise direction.

A No. 3 counterweight 43 is connected to the third crank arm 33. The No. 3 counterweight 43 is oriented so that a plane extending from it center of gravity to the crankshaft axis 50 is rotated between 220 and 245 degrees (preferably 236.78 degrees) from the crankshaft plane 60 in the clockwise direction.

A No. 6 counterweight 46 is connected to the sixth crank arm 36. The No. 6 counterweight 46 is oriented so that a plane extending from its center of gravity to the crankshaft axis 50 is rotated between 40 and 65 degrees (preferably 53.6 degrees) from the crankshaft plane 60 in the clockwise direction. The orientation of the Nos. 6 and 3 counterweights 46, 43 define a first counterweight angle equal to the difference between the clockwise rotation of the Nos. 3 and 6 counterweights from the crankshaft plane 60.

A No. 7 counterweight 47 is connected to the second crank arm 32. The No. 7 counterweight 47 is oriented so that a plane extending from its center of gravity to the crankshaft axis 50 is rotated between 20 and 40 degrees (preferably 29 degrees) from the crankshaft plane 60 in the clockwise direction. The orientation of the Nos. 7 and 2 counterweights 47, 42 defines a second counterweight angle equal to the difference between the clockwise rotations of he Nos. 2 and 7 counterweights from the crankshaft plane 60.

A No. 8 counterweight 48 is connected to the second crank arm 32. The No. 8 counterweight 48 is oriented so that a plane extending from its center of gravity to the crankshaft axis 50 is rotated between 0 and 10 degrees (preferably 0.9 degrees) from the crankshaft plane 60 in the clockwise direction. The orientation of the Nos. 8 and 1 counterweights 48, 41 define a third counterweight angle equal to the difference between the clockwise rotations of the Nos. 1 and 8 counterweights from the crankshaft plane 60.

The counterweights are oriented with respect to one another so that at least one of the angles from the group consisting of the first, second and third counterweight angles is not 180 degrees.

The counterweights serve to balance the rotating moment caused by the crank pins 21, 22, 23, 24 and their respective connecting rod and piston assemblies. The crankshaft 10 is internally balanced. The counterweights also serve to reduce the bearing loads on main journals 11, 12, 13, 14 and 15. Of critical importance are the intermediate main journals 12 and 14 which have the highest bearing loads and lowest oil film thicknesses. Main journal 13 also has a low oil film thickness. Main journals 11 and 15 are not as heavily loaded and generally have high oil film thicknesses.

The boundary between crank arms 31, 32, 33, 36, 37 and 38 and counterweights 41, 42, 43, 46, 47 and 48 attached to them, respectively, is not clearly visible on the actual crankshaft 10 in its manufactured sat. It is convenient for analysis purposes, however, to separate the crank arms and counterweights. The boundary of a crank arm is generally defined by a radius that is 3-5 mm larger than the main journal radius. This would define the lower portion of the crank arm if it had no counterweight. The boundary of a crank arm is usually determined by the minimum structural material required to carry the loads imparted by the connecting rods to the crankshaft. The counterweights are then attached to the crank arms such that the crankshaft moments are balanced with minimum mass and maximum oil film thickness on the main journals 11, 12, 13, 14 and 15.

The crank pins 21 and 24 and their respective connecting rods combine to create a vertical moment which rotates with the crankshaft. The crank pins 22 and 23 and their respective connecting rods combine to create a horizontal moment which rotates with the crankshaft. The moment created by crank pins 21 and 24 is approximately three times the moment created by crank pins 22 and 23, since crank pins 21 and 24 are approximately three times further apart axially than crank pins 22 and 23. The combination of the vertical and horizontal moments results in a plane of balance that is approximately 18 degrees clockwise from the vertical plane between crank pins 21 and 24, when viewed from the front of the engine.

For a minimum mass counterweight arrangement, all counterweights would be aligned with this plane of balance. However, the bearing loads would be very high. For minimum bearing loads, all counterweights would be directly opposite their respective crank arms. However, the mass of the crankshaft and the required package size would be very high. Most V-8 crankshaft designs have some sort of compromise between these two extremes.

It is possible for an alternative crankshaft to have a symmetric counterweight arrangement which has acceptable oil film thicknesses and crankshaft mass, and meets packaging constraints. This arrangement has a small counterweight attached to the fourth crank arm which is symmetric to the effective counterweight caused by the timing wheel. The second main journal, corresponding to main journal 12 in FIG. 1, has the lowest bearing oil film thickness with this counterweight arrangement and the firing order of this engine.

The non-symmetric counterweight arrangement of this invention increases the high speed minimum oil film thickness of main journal 12 by 9% without increasing the crankshaft mass, as compared to the alternative crankshaft having the symmetric design. The minimum oil film thickness of main journal 13 decreases slightly, but it is still higher than the minimum oil film thickness of main journal 12. Thus, the lowest minimum oil film thickness occurring on any of the main journals increases by 9% compared to the alternative crankshaft having the symmetric design. Compared to the alternative crankshaft having the symmetric design, counterweight 43 increases in size by 8%, and its angle with the vertical axis defined by crank pins 21 and 24 increases by 3 degrees. Counterweight 48 decreases in size by 0.5%, and its angle with the vertical axis defined by crank pins 21 and 24 decreases by 1 degree. The counterweight attached to the fourth crank arm of the alternative crankshaft is be eliminated.

The non-symmetric crankshaft 10 can also be used in engines with different firing orders. One such crankshaft 10 has its minimum oil film thickness occur on main journal 14. The small counterweight 44 which would be attached to arm 34 is enlarged instead of being eliminated as described above. Counterweight 43 decreases in size, and its angle with the vertical axis defined by crank pins 21 and 24 decreases compared to the alterative crankshaft having the symmetric design. Counterweight 46 increases in size, and its angle with the vertical axis defined by crank pins 21 and 24 increases. The net effect is to improve the oil film thickness on main journal 14. The oil film thickness on main journals 12 and 13 is reduced, but it is still higher than the oil film thickness on main journal 14. Therefore, the minimum oil film thickness occurring on any of the main journals 11, 12, 13, 14, 15 increases with the non-symmetric counterweight design.

Similar benefits of non-symmetric counterweights can be obtained for a second alterative crankshaft which is a mirror image of the crankshaft 10. The crank pin of the second alternative crankshaft corresponding to crank pin 22 is oriented 90 degrees counterclockwise from eh crank pin corresponding to crank pin 21. The crank pin corresponding to crank pin 23 is oriented 270 degrees counterclockwise form the crank pin corresponding to crank pin 21. The crank pin corresponding to crank pin 24 is oriented 180 degrees from the crank pin corresponding to crank pin 21. The relative angular positions of the counterweights and rank pins in the second alternative crankshaft are the same as shown in FIGS. 1-13 except that, in the second alternative crankshaft, the specified angles refer to counterclockwise rotation from the crankshaft plane 60. For example, the counterweight of the second alternative crankshaft corresponding to the No. 1 counterweight 41 is rotated between 180 and 190 degrees counterclockwise from the crankshaft plane 60.

Counterweights 41 and 48 are larger in magnitude (mass times radius) than the other counterweights 42, '43, 45, 46, 47. This is accomplished mostly with a larger thickness for the counterweights. Most previous crankshafts have a ratio of approximately 2.0 for the thickness of counterweight 41 divided by counterweight 42. Similar ratios have also been used for the thickness of counterweight 48 divided by counterweight 47. These two ratios are both 1.37 for the crankshaft 10. This Using a lower counterweight thickness ratio moves more of the counterweighting closer to the heavily loaded main journals 12 and 14. This improves the bearing loads and film thickness. The lower ratio also shortens the span between main journals 11 and 12, and between main journals 14 and 15, which reduces the stress on arms 32 and 37. The lower ratio also shortens the length of the crankshaft 10 and thus the engine, but it requires a slightly larger counterweight outer radius.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

The embodiments of the invention in which an exclusive property or privilege is claimed are defined as follows:

1. A crankshaft for a V-type engine comprising;
   a first crank arm extending between a firs main journal and a first crank pin, said first crank pin being parallel to said first main journal;
   a second crank arm extending between said first crank pin and a second crank journal, said first and second main journals being coaxial;
   a third crank arm extending between said second main journal and a second crank pin, said second crank pin being parallel to said second main journal;
   a fourth crank arm extending between said second crank pin and a third main journal, said second and third main journals being coaxial;
   a fifth crank arm extending between said third main journal and a third crank pin, said third crank pin being parallel to said third main journal;
   a sixth crank arm extending between said third crank pin and a fourth main journal, said third and fourth main journals being coaxial;
   a seventh crank arm extending between said fourth main journal and a fourth crank pin, said fourth crank pin being parallel to said fourth main journal;
   an eighth crank arm extending between said fourth crank pin and a fifth main journal,
   the axes of said main journals defining a crankshaft axis and a crankshaft plane, said crankshaft plane extending between said crankshaft axis and the axis of said first crank pin,
   said second crank pin being oriented so that a plane extending between its axis and said crankshaft axis is rotated 90 degrees from said crankshaft plane in a clockwise direction as viewed from said first to second main journals along said crankshaft axis,
   said third crank pin being oriented so that a plane extending between its axis and said crankshaft axis si rotated 270 degrees from said crankshaft plane in said clockwise direction,
   said fourth crank pin being oriented so that a plane extending between its axis and said crankshaft axis is rotated 180 degrees from said crankshaft plane;
   a No. 1 counterweight connected to said first crank arm, said No. 1 counterweight being oriented so that a plane extending from its center of gravity to said crankshaft axis is rotated between 180 and 190 degrees from said crankshaft plane in said clockwise direction;
   a No. 2 counterweight connected to said second crank arm, said No. 2 counterweight being oriented so that a plane extending from its center of gravity to said crankshaft axis is rotated between 200 and 220 degrees from said crankshaft plane in said clockwise direction;
   a No. 3 counterweight connected to said third crank arm, said No. 3 counterweight being oriented so that a plane extending from its center of gravity to said crankshaft axis is rotated between 220 and 245 degrees from said crankshaft plane in said clockwise direction;
   a No. 6 counterweight connected to sixth crank arm, said No. 6 counterweight being oriented so that a plane extending from its center of gravity to said crankshaft axis is rotated between 40 and 65 degrees from said crankshaft plane in said clockwise direction, the orientation of said Nos. 6 and 3 counterweights defining a first counterweight angle equal to the difference between the rotations of said Nos. 3 and 6 counterweights from said crankshaft plane in said clockwise direction;
   a No. 7 counterweight connected to said second crank arm, said No. 7 counterweight being oriented so that a plane extending from its center of gravity to said crankshaft axis is rotated between 20 and 40 degrees from said crankshaft plane in said clockwise direction, the orientation of said Nos. 7 and 2 counterweights defining a second counterweight angle equal to the difference between the rotations of said Nos. 2 and 7 counterweights from said crankshaft plane in said clockwise direction; and
   a No. 8 counterweight connected to said second crank arm, said No. 8 counterweight being oriented so that a plane extending from its center of gravity to said crankshaft axis is rotated between 0 and 10 degrees from said crankshaft plane in said clockwise direction, the orientation of said Nos. 8 and 1 counterweights defining a third counterweight angle equal to the difference between the rotations of said Nos. 1 and 8 counterweights from said crankshaft plane in said clockwise direction,
   said counterweights being oriented with respect to one another so that at least one of the angles from the group consisting of said first, second and third counterweight angles is not 180 degrees,
   said crankshaft being internally balanced.

2. A crankshaft as set forth in claim 1 wherein the ratio between the thickness of said No. 1 counterweight and said No. 2 counterweight is less than 1.6.

3. A crankshaft as set forth in claim 1 wherein a counterweight is not connected to said fourth crank arm.

4. A crankshaft as set forth in claim 1 wherein said No. 1 counterweight is oriented so that said plane extending from its center of gravity to said crankshaft axis is rotated 181.97 degrees from said crankshaft plane in said clockwise direction;

said No. 2 counterweight is oriented so that said plane extending from its center of gravity to said crankshaft as is rotated 209 degrees from said crankshaft plane in said clockwise direction;

said No. 3 counterweight is oriented so that said plane extending from its center of gravity to said crankshaft axis is rotated 236.78 degrees from said crankshaft plane in said clockwise direction;

said No. 6 counterweight is oriented so that said plane extending from its center of gravity to said crankshaft axis is rotated 53.6 degrees from said crankshaft plane in said clockwise direction, said No. 7 counterweight is oriented so that said plane extending from its canter of gravity to said crankshaft axis is rotated 29 degrees from said crankshaft plane in said clockwise direction; and said No. 8 counterweight is oriented so that a plane extending from its center of gravity to said crankshaft axis is rotated 0.9 degrees from said crankshaft plane in said clockwise direction.

5. A crankshaft as set froth in claim 1 and further comprising a timing wheel integral with said fifth crank arm, said timing wheel being equivalent to a No. 5 counterweight oriented so that a plane extending from its center of gravity to said crankshaft axis is rotated 90 degrees in said clockwise direction.

* * * * *